UNITED STATES PATENT OFFICE.

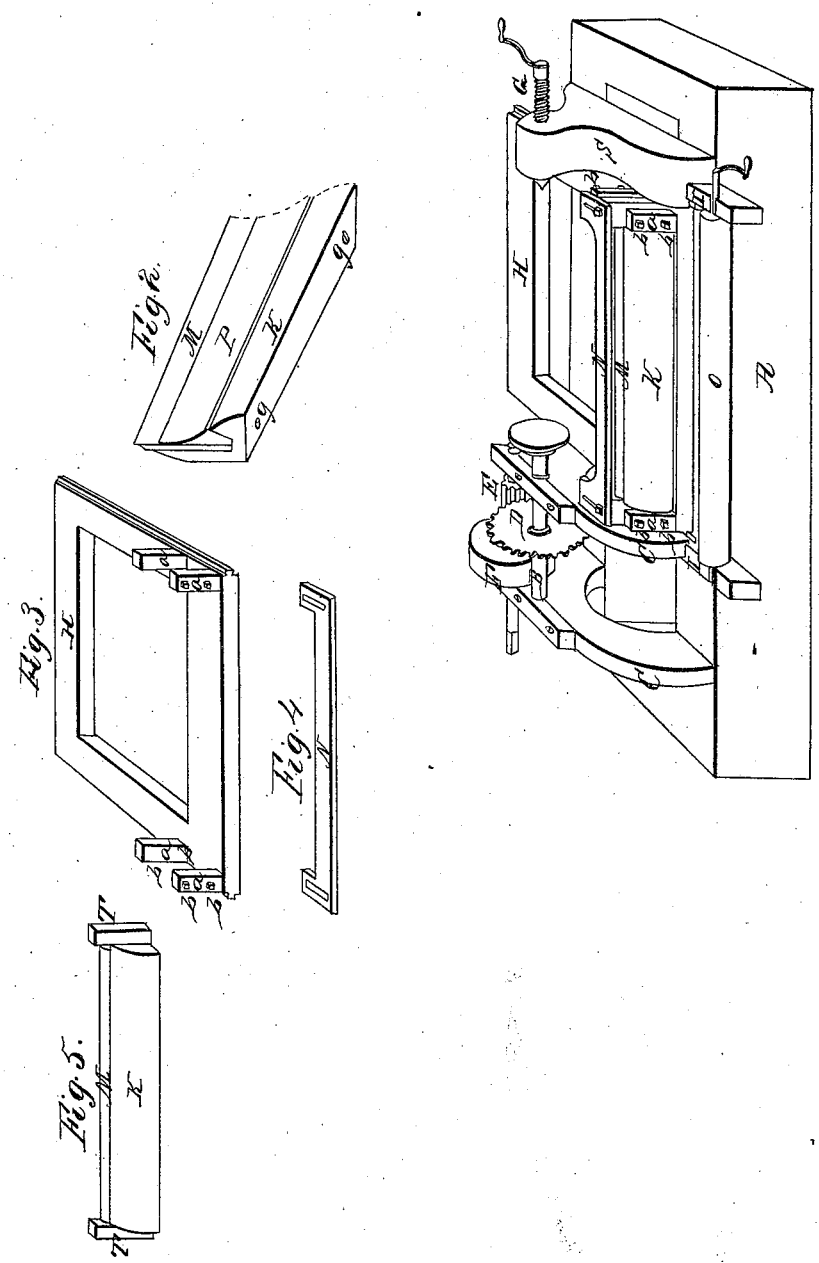
J. Dresser,
Cutting Veneers.
N° 1,758.    Patented Sep. 3, 1840.

JOHN DRESSER, OF STOCKBRIDGE, MASSACHUSETTS.

IMPROVEMENT IN MACHINES FOR CUTTING VENEERS.

Specification forming part of Letters Patent No. 1,758, dated September 3, 1840.

*To all whom it may concern:*

Be it known that I, JOHN DRESSER, of Stockbridge, in the county of Berkshire and State of Massachusetts, have invented a new and useful Improvement in Machines for Cutting Veneers; and I do hereby declare that the following is a full and exact description.

This machine consists of a strong wood or iron frame, A, upon one end of which an arbor or mandrel, B, rests upon two iron stands, C C. Upon the mandrel is placed a large cog-wheel, D, which is to be propelled by a smaller cog-wheel, E, the shaft of which rests upon the same stands with the mandrel. Upon this shaft is placed a pulley, F, for a driving-belt to run upon. Upon the other end of the frame is another stand, S, holding a center pin or screw, G, the whole forming a machine similar to the common turning-lathe. An iron sliding frame or carriage, H, is placed across the frame of the machine or lathe between the mandrel and the screw-stands, and moves at right angles with the mandrel. On each side of this carriage is a bar of iron, $i\ i$, confined to the frame of the lathe and to the stands in which the mandrel and screw are placed. In these bars are grooves for the edges of the carriage to traverse in. On the front end of the carriage, near each corner, are two posts or studs, $a\ a\ a\ a$, between which the ends or tenons of the stock T T, Fig. 5, for holding the knife, are confined by the screws $b\ b\ b\ b\ b\ b\ b\ b$, two screws passing through each stud and pressing against the tenons of the stock. (See Figs. 3 and 5.) By the help of these screws the position of the stock, together with the knife, may be varied, so as to carry the knife to the block at a proper angle to cut smoothly and with ease.

The stock K is a heavy bar of cast-iron, with a groove or channel made in the upper side of it. This groove is broader at the top than at the bottom, and reaches the whole length of the stock.

The knife M is a thin plate of steel, nearly as long as the stock, which is placed in the groove with its edge upward, and confined by an iron key, P, Fig. 2, which is made to fill the space between the knife and the oblique side of the groove. This key, which does not touch the bottom of the groove, is forced into its place by screws $g\ g$, Fig. 2, passing through the bottom of the stock. It is necessary that the knife should always stand nearly in the same position as respects the carriage and the block to be cut. Therefore the side of the stock which is presented to the block, together with the key and knife, should be so fitted and ground as to form a segment of a circle equal to the circumference of the largest block intended to be cut, so that blocks of various sizes may be brought in contact with the edge of the knife without touching the stock. On each end of the stock is a stud or tenon, T T, Fig. 5, which may be cast with and forming a part of the stock, or may be separate blocks or pieces fastened to the ends of the stock by screws. These tenons stand perpendicular against the groove and rise a short distance above the stock.

The gage N, Fig. 4, is a flat bar of iron, the ends of which rest upon the tenons of the stock. Near each end is a mortise cut crosswise through the bar, and each mortise has a screw passing through it and into a tenon of the stock, and the heads of the screws, resting upon the top of the bar, hold it fast in its place. By passing the screws through mortises instead of round holes, the bar may be moved back and forward a short distance edgewise, as occasion may require, without removing the screws. The edge of the bar or gage, which is presented to the block while the knife is cutting, should lie a short distance above the edge of the knife and as far back of the edge of the knife as the thickness of the veneer to be cut—that is, when it is required to cut a veneer one-thirtieth part of an inch in thickness the gage must be placed one-thirtieth part of an inch farther back or from the center of the block than the edge of the knife is.

When the machine is to be put in operation, put the stock, together with the knife, in its place upon the carriage and so adjust and confine it by the screws $a\ a\ a\ a$ that the edge of the knife (lying upward) shall be as far above the top of the carriage as the center of the mandrel is, and also parallel with the mandrel and center-pin. Place a cylindrical block of wood in the machine between the mandrel and center-pin, put the machine in motion, and, while the block is revolving, move the carriage forward until the knife comes in contact with the block and begins to cut, when the gage will rest against the block and prevent the knife from penetrating the wood beyond a given depth. If the motion is continued and the gage kept against the block by a gentle pressure, a veneer of uniform thickness and fifty feet in length may be cut in less than one minute, showing a very smooth surface, and without parting the grains of the timber.

At a little distance from the frame of the machine is a small cylinder, o, resting on the ends of the grooved bars i i in front of the machine. Upon this cylinder the veneers may be rolled as fast as they are cut, and the cylinder may be removed and the veneers taken from it without unrolling.

The carriage may be moved by hand, or it may be moved by a spring or by weights. Water, steam, or horse power may be used to propel the machine, or by placing a crank upon the end of the shaft of the cog-wheel E it may be propelled by hand.

The block to be cut into veneers may be turned of equal bigness from end to end before placing it in the machine, or it may be placed in the machine and turned with a gage, using the gage for a rest. By this method of cutting veneers the compressing-roller and slide heretofore in use, together with the complicated machinery necessarily connected with them, are dispensed with, and the machinery is so simple that it may be advantageously used and kept in repair by ordinary mechanics. The veneers can be cut as thin as paper, and the smooth surface they present will save those who use them much labor in finishing their work after the veneers are laid. The knife, in connection with the stock and carriage, may be of any required length, so that a veneer may be cut from one to six feet wide in an ordinary machine, and if necessary, fifteen hundred feet in length.

What I claim as my invention, and desire to secure by Letters Patent, is—

The particular manner of cutting veneers with a knife from cylindrical blocks of timber revolving in a common turning-lathe or other similar machine, as herein set forth.

JOHN DRESSER.

Witnesses:
ANSON CLARK,
EDWIN H. CLARK.